(12) United States Patent
Marble

(10) Patent No.: US 8,931,604 B2
(45) Date of Patent: Jan. 13, 2015

(54) DAMPER ASSEMBLY WITH MONOTUBE AND DYNAMIC COMPRESSION VALVE AND VEHICLE HAVING SAME

(71) Applicant: GM Global Technology Operations LLC, Detroit, MI (US)

(72) Inventor: Robert P. Marble, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/905,479

(22) Filed: May 30, 2013

(65) Prior Publication Data

US 2014/0353938 A1  Dec. 4, 2014

(51) Int. Cl.
| | |
|---|---|
| F16F 15/03 | (2006.01) |
| F16F 9/06 | (2006.01) |
| B60G 11/26 | (2006.01) |
| F16F 9/34 | (2006.01) |

(52) U.S. Cl.
CPC ................ *F16F 9/062* (2013.01); *B60G 11/26* (2013.01); *F16F 9/34* (2013.01)
USPC .......................... 188/318; 188/267.2; 188/167

(58) Field of Classification Search
USPC ............. 188/318, 267, 267.2; 267/64.28, 218
See application file for complete search history.

(56) References Cited

U.S. PATENT DOCUMENTS

| | | | | | |
|---|---|---|---|---|---|
| 3,795,291 | A | * | 3/1974 | Naito et al. ................... | 188/274 |
| 4,616,810 | A | * | 10/1986 | Richardson et al. .......... | 267/218 |
| 4,732,244 | A | * | 3/1988 | Verkuylen ..................... | 188/318 |
| 6,213,263 | B1 | * | 4/2001 | De Frenne .................... | 188/318 |
| 6,279,701 | B1 | * | 8/2001 | Namuduri et al. ......... | 188/267.2 |
| 7,051,849 | B2 | * | 5/2006 | Browne et al. ................ | 188/267 |
| 7,779,974 | B2 | * | 8/2010 | Timoney et al. ............. | 188/318 |
| RE44,609 | E | * | 11/2013 | Robertson .................. | 267/64.15 |
| 8,695,765 | B2 | * | 4/2014 | Danek et al. .................. | 188/284 |

* cited by examiner

*Primary Examiner* — Christopher Schwartz
(74) *Attorney, Agent, or Firm* — Quinn Law Group, PLLC

(57) ABSTRACT

The damper assembly has a damper housing at least partially defining an interior chamber. A free piston is positioned in the damper housing to separate the interior chamber into a gas-filled chamber and a fluid-filled chamber. A piston assembly is configured to move within the fluid-filled chamber and separates the fluid-filled chamber into an extension chamber and a compression chamber. A valve assembly separates the compression chamber into a primary chamber adjacent the piston assembly and a secondary chamber adjacent the free piston. The valve assembly is configured to restrict flow from the primary chamber to the secondary chamber to cause a pressure drop during compression by the piston assembly. The free piston is configured to slide within the damper housing in response to fluid displacement caused by movement of the piston rod in the fluid-filled chamber.

19 Claims, 3 Drawing Sheets

DAMPER ASSEMBLY WITH MONOTUBE AND DYNAMIC COMPRESSION VALVE AND VEHICLE HAVING SAME

TECHNICAL FIELD

The present teachings generally include a damper assembly such as for a vehicle.

BACKGROUND

Damper assemblies are used in vehicle suspension systems to dissipate energy as road forces are reacted at the wheel. Dampers act between the vehicle wheels and body to minimize energy transfer to the vehicle frame and body while maintaining contact between the tires and the road. Monotube dampers utilize a single fluid-filled tube, with a piston assembly that moves within the tube against the fluid. The piston assembly is connected to the vehicle body, and a housing of the damper assembly is connected to a tire and wheel assembly. A piston rod moves within the damper and extends out of the tube. A gas chamber with a floating piston is housed at the end of the housing opposite the rod end. The floating piston separates the gas chamber and the fluid-filled chamber, and moves to accommodate the volume displacement caused by the moving rod. Pressurized gas in the gas chamber requires a static pressure level commensurate with a desired damping ability of the damper assembly. Seals within the damper assembly, such as a seal around the moving rod, must be designed in accordance with the static and dynamic range of pressures. A high static pressure level and tight rod seal will contribute to friction against the moving rod.

SUMMARY

A damper assembly is provided with a damper housing at least partially defining an interior chamber. A free piston is positioned in the damper housing to separate the interior chamber into a gas-filled chamber and a fluid-filled chamber. A piston assembly is configured to slide within the fluid-filled chamber and separate the fluid-filled chamber into an extension chamber and a compression chamber.

A valve assembly separates the compression chamber into a primary chamber adjacent the piston assembly and a secondary chamber adjacent the free piston, and is configured to restrict flow from the primary chamber to the secondary chamber to cause a pressure drop during compression by the piston assembly. The free piston is configured to slide within the damper housing to compensate for volume displacement caused by movement of the piston assembly in the fluid-filled chamber. More specifically, the piston assembly has a piston and a piston rod. The volume of the piston rod within the fluid-filled chamber varies as the piston assembly moves, displacing fluid within the fluid-filled chamber.

The valve assembly enables a reduced static gas pressure in the gas chamber, and, in turn, less friction at a rod-to-seal interface than a traditional monotube damper. The valve assembly thus supplements compression damping and enables a reduced static pressure to support the primary valve compression damping without cavitation.

In one aspect of the present teachings, the housing of the damper assembly can be configured with a reduced overall height in comparison to a traditional monotube damper by packaging the valve assembly in a leg of the housing perpendicular to two parallel legs, one containing the sliding piston and one containing the floating piston. The damper assembly is not limited to a housing with this configuration, however, and other suitable housing arrangements can instead be used.

In one aspect of the present teachings, the valve assembly is configured to operate passively in response to fluid forces within the interior chamber. Accordingly, the damper assembly can be a completely passive hydraulic damper with hydraulic oil in the fluid-filled chamber. Alternatively, the damper assembly can also be used in an active or semi-active suspension system. In one example embodiment, the fluid-filled chamber can be filled with magnetorheological fluid, and the piston assembly can be configured to enable a selectively applied magnetic flux to tune the damping level in response to vehicle conditions. This configuration is adaptable to any monotube design and can have passive or active elements that are fluid-based (e.g., variable rheology), or valve-based (e.g., solenoid controlled or controlled by other means).

The above features and advantages and other features and advantages of the present teachings are readily apparent from the following detailed description of the best modes for carrying out the present teachings when taken in connection with the accompanying drawings.

DETAILED DESCRIPTION

Figure 1:
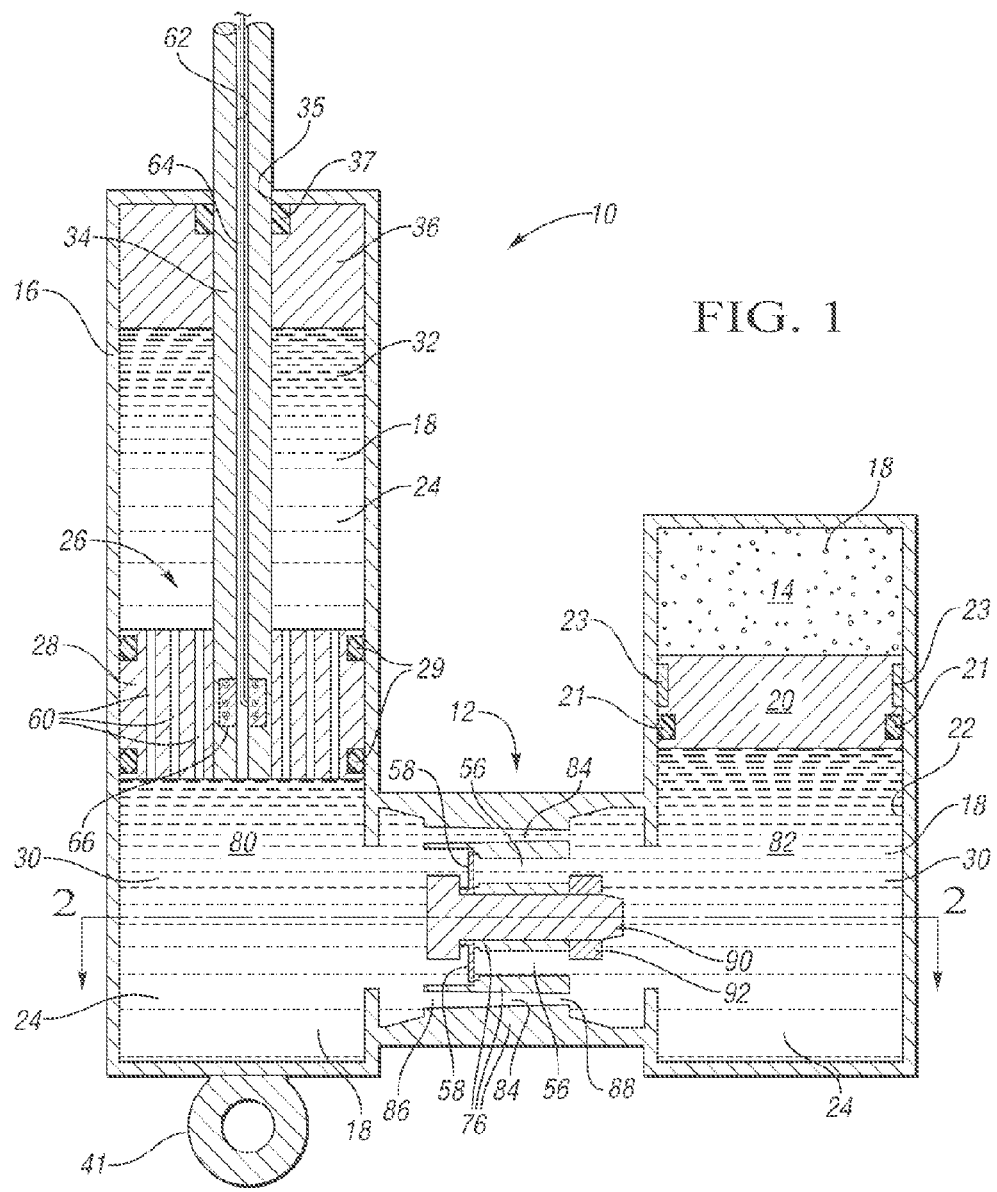
FIG. 1 is a schematic illustration in cross-sectional view of a damper assembly of FIG. 1 taken at lines 1 in FIG. 2.
Figure 2:
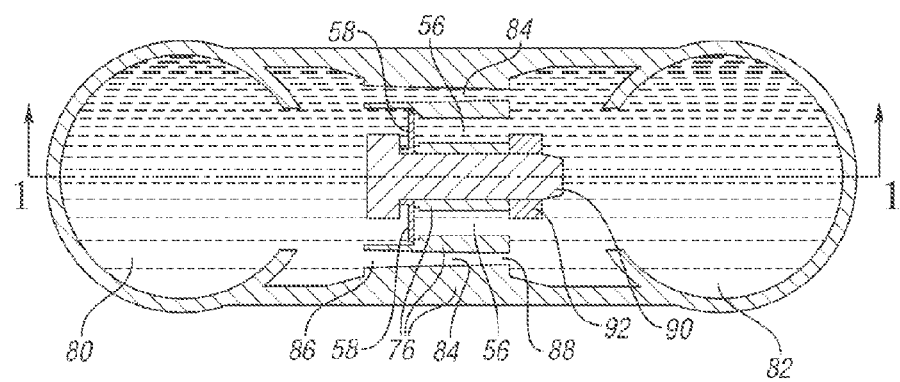
FIG. 2 is a schematic illustration in cross-sectional view of the damper assembly of FIG. 1 taken at lines 2 in FIG. 1.

Referring to the drawings, wherein like reference numbers refer to like components, FIG. 1 shows a damper assembly 10 that utilizes a passive valve assembly 12 to supplement compression damping and thereby enable a reduced gas pressure in a gas-filled chamber 14. The valve assembly 12 can also be referred to as a supplemental valve assembly 12. The damper assembly 10 is a component of a suspension system 15 of a vehicle 17, as further described with respect to FIGS. 5 and 6.

The damper assembly 10 has a housing 16 that defines an interior chamber 18. A floating piston 20 seals to the interior wall 22 of the housing 16 with a compliant seal 21 and a low friction material interface member 23 to separate the interior chamber 18 into the gas-filled chamber 14 and a fluid-filled chamber 24. The fluid-filled chamber 24 includes a primary chamber 80 and a secondary chamber 82 separated by the valve assembly 12 as further described herein. The floating piston 20 can also be referred to as a free piston, and moves to compensate for volume displaced by a piston rod 34 moving in the fluid filled chamber 82 during translation of a piston assembly 26 having a sliding piston 28 connected to the piston rod 34. The gas-filled chamber 14 is filled with an inert charge gas sufficient to provide replenishment of the fluid back through the supplemental valve assembly 12 into the primary fluid-filled chamber 80.

The damper assembly 10 has a piston assembly 26 that slides within the fluid-filled chamber 24. The piston assembly 26 includes a sliding piston 28 that can be sealed to the interior wall 22 with compliant or rigid sealing elements 29, and slides against the interior wall 22. The sliding piston 28 separates the fluid-filled chamber 24 into a compression chamber 30 and an extension chamber 32. The rod 34 extends from the piston 28 outside of the housing 16 through a housing opening 35. A rod guide 36, also referred to as a bearing, is fixed inside the housing 16 at an end of the interior chamber 18 and surrounds the rod 34. A rod seal 37 ensures that fluid in the fluid-filled chamber 24 cannot leak past rod 34 out of the opening 35.

Figure 5:
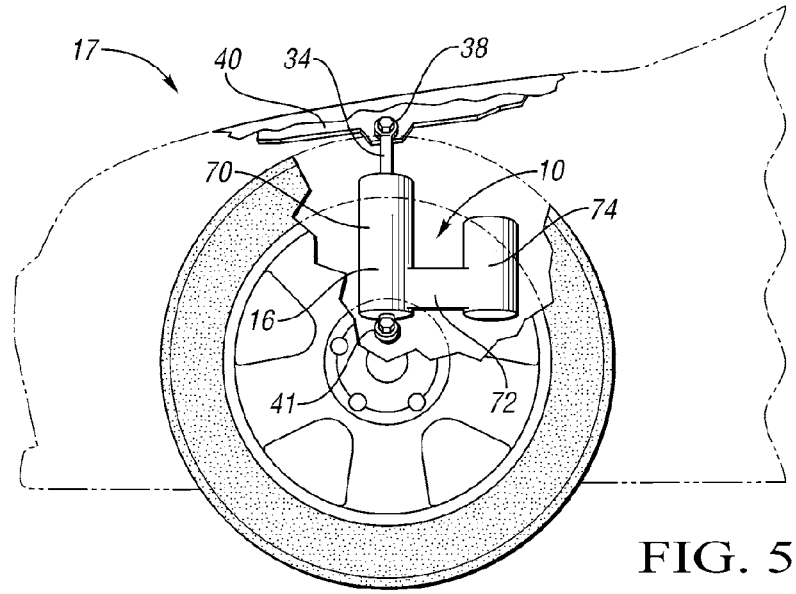
FIG. 5 is a schematic illustration in fragmentary side view of a portion of a vehicle showing a vehicle tire and wheel assembly and a suspension system with the damper assembly of FIGS. 1-4, with the tire and wheel assembly shown in phantom.
Figure 6:
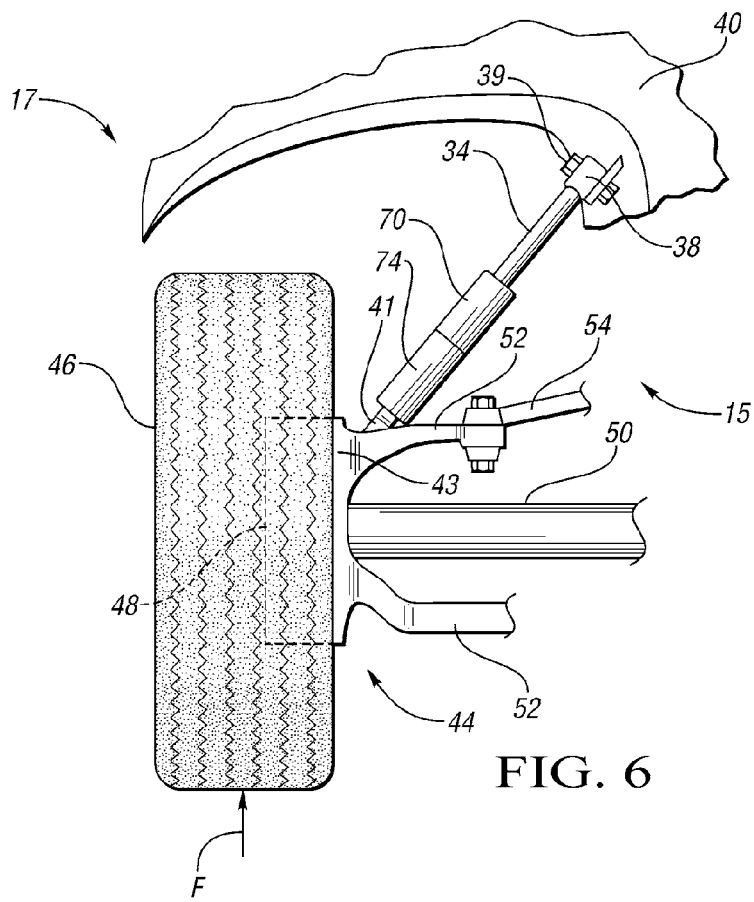
FIG. 6 is a schematic illustration in fragmentary rear view of a portion of the vehicle of FIG. 5.

FIGS. 5 and 6 show that an end 38 of the rod 34 has an attachment 39 secured to a sprung mass by a fastener. The sprung mass can be a vehicle structural component, such as a vehicle body 40 or a vehicle frame component. A dust cover or an external tube can extend around the rod 34 to protect the opening 35, but is removed for purposes of illustration in the drawings. The housing 16 has another similar attachment 41 that is fit to a nonrotating component 43 of vertical suspension assembly 44 (e.g., a control arm, hub or other like component). The vertical suspension assembly 44 has a tire 46 fit to a wheel 48 that rotates via a drive axle 50. Control arms 52 and a steering link 54 extend from the non-rotating component 43. When the vehicle 17 travels over a road, forces due to an uneven road surface, such as force F shown in FIG. 6, can be damped by the damper assembly 10 to prevent their transfer to the vehicle body 10, ensuring a smooth ride for vehicle occupants and normalize contact load between road and tire 46.

Figure 3:
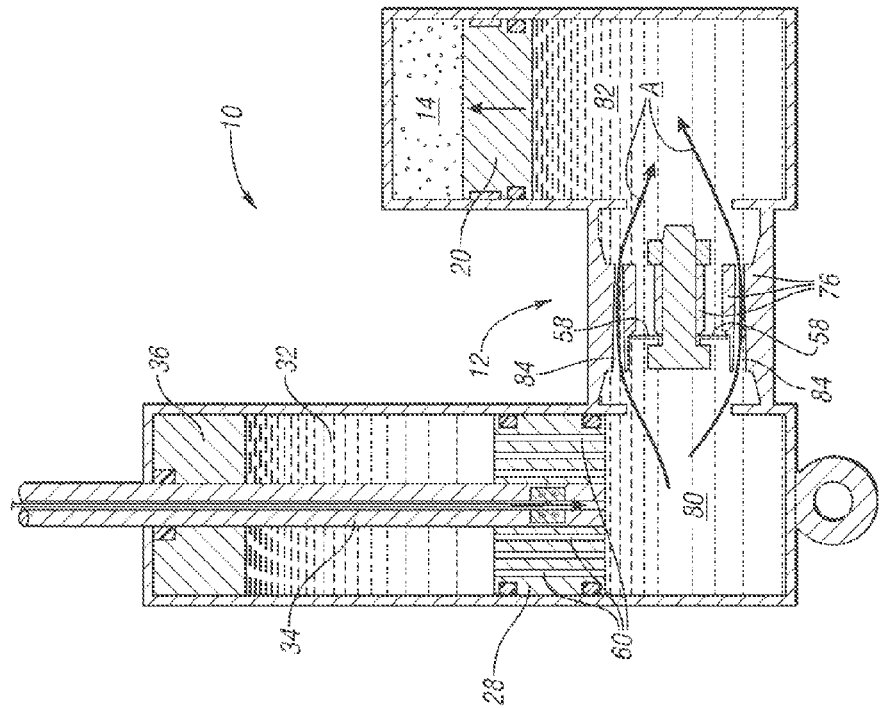
FIG. 3 is a schematic fragmentary illustration in cross-sectional view of the damper assembly of FIG. 1 with a piston assembly in an extension stroke.
Figure 4:
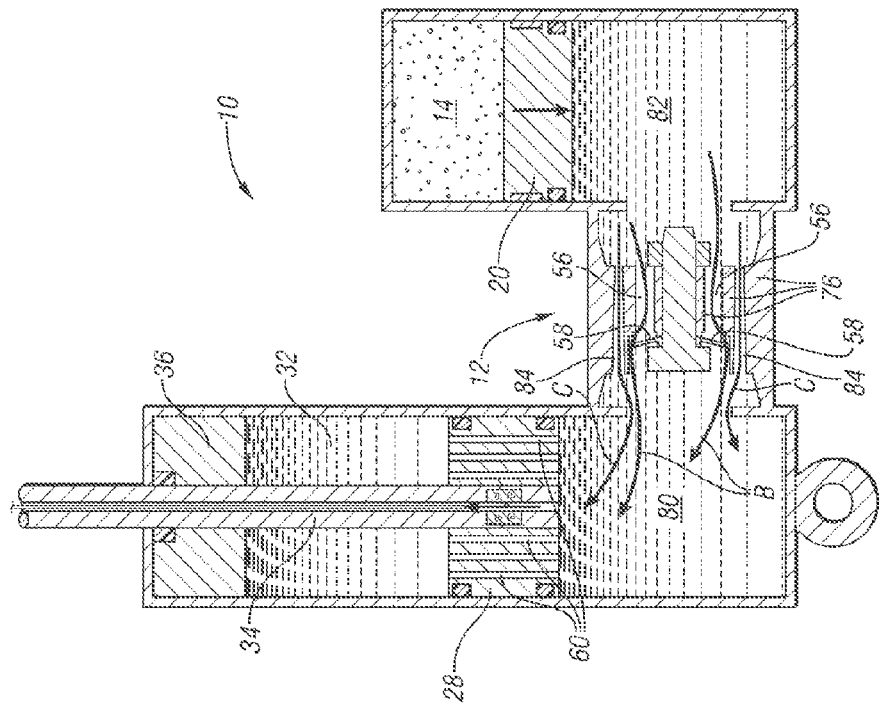
FIG. 4 is a schematic fragmentary illustration in cross-sectional view of the damper assembly of FIG. 1 with the piston assembly in a compressive stroke.

Referring again to FIG. 1, the road forces cause the sliding piston 28 to slide within the fluid-filled chamber 24 either in downward direction in a compressive mode, shown in FIG. 4, or in an upward direction in an extension mode, shown in FIG. 3. The movement of the sliding piston 28 generates a differential pressure between the fluid-filled chambers 32 and 80. The fluid in the fluid-filled chamber 24 is incompressible. Thus, when the piston 28 translates downward as in FIG. 4, a greater length of the rod 34 extends into the fluid-filled chamber 24. Fluid movement due to the volume displacement of the rod 34 causes the floating piston 20 to move upward and further compress the gas in the gas-filled chamber 14. When road forces cause the piston assembly 26 to instead slide upward in the interior chamber 18 as shown in FIG. 3, a portion of the rod 34 exits the fluid-filled chamber 24, causing a reduction in volume in the fluid-filled chamber 24 so that the floating piston 20 slides downward in FIG. 3.

In order to enable significant damping, the gas charge pressure in the gas-filled chamber 14 must be high enough to react against the fluid forces in the fluid-filled chamber 24 both during static conditions and dynamic compression. That is, the damping available is limited by the gas charge. Increasing the gas charge pressure, however, increases the pressure acting on the rod seal 37, which increases relative friction between the seal 37 and the moving rod 34.

A pressure drop is created across the valve assembly 12 during dynamic compression in order to achieve a high enough dynamic pressure while allowing a lower static pressure acting on the floating piston 20 than in a conventional monotube damper, and thus a lower gas charge pressure in the gas-filled chamber 14. Specifically, the valve assembly 12 separates the compression chamber 30 into a primary chamber 80 adjacent the piston assembly 26 and a secondary chamber 82 adjacent the free piston 20. The valve assembly 12 is configured to restrict flow from the primary chamber 80 to the secondary chamber 82 to cause a pressure drop during compression by the piston assembly 26. The free piston 20 is configured to slide within the damper housing 16 in response to the fluid volume displacement in the fluid chamber 82 caused by the moving piston rod 34 (i.e., fluid forced into fluid chamber 82 due to the change in volume of the rod 34 that is within the chamber 24 due to translation of the piston assembly 26).

The valve assembly 12 has a valve body 76 with a first flow passage 84 that provides restriction between the primary chamber 80 to the secondary chamber 82. This can be achieved with any scalable orifice as a metering method, and can be straight, tapered or otherwise shaped. In the embodiment shown, the first flow passage 84 tapers from the primary chamber 80 to the secondary chamber 82. The example valve assembly 12 is configured to be more restrictive of flow from the primary chamber 80 to the secondary chamber 82 than of flow from the secondary chamber 82 to the primary chamber 80. The first flow passage 84 is annular, and has a greater flow area at a first end 86 than at a second end 88. Multiple first flow passages 84 can be formed in the valve body 76 and spaced around the generally cylindrical section of the housing 16 containing the valve assembly 12. The passages 84 can be defined by aligned openings of multiple stacked discs held together by a central fastener 90 and nut 92. Alternatively, the valve body 76 can be an integral single component.

The valve assembly 12 also has a second flow passage 56 that can be an annular passage or series of passages extending from the primary chamber 80 to the secondary chamber 82. The valve assembly 12 includes one or more one-way valves 58 that are configured to block flow from the primary chamber 80 through the second flow passage 56. That is, the one-way valves 58 are configured to prevent flow through the second flow passage 56 when the piston is in compression mode (as in FIG. 4). In this mode, flow, represented by arrows A, is permitted only through passages 84. However, the one-way valves 58 permit flow from the secondary chamber 82 to the primary chamber 80 through the second flow passage 56 when the piston 28 is in expansion mode (as in FIG. 3). In this mode, flow is permitted through passages 56, as represented by arrows B, and also through passages 84, as represented by arrows C.

The one-way valves 58 can be one or more ball check valves, one or more valve plates, one or more flapper members, or any other suitable one-way valve or valves. In the embodiment shown, the one-way valves 58 are flapper members that are held against the valve body 76 by the fastener 90, such as a bolt or rivet, and are configured to be pushed against the valve body 76 when the piston 28 is in compression mode, as shown in FIG. 4. The flapper members are configured to pivot open toward the primary chamber 80, moving away from the valve body 76, when the piston 28 is in expansion mode, as shown in FIG. 3.

Referring again to FIG. 1, the piston 28 has a series of passages 60 that fluidly connect the extension chamber 32 with the compression chamber 30 to allow the noncompressible fluid to move between the chambers 30, 32 as the piston 28 slides in the housing 16. The fluid in the fluid-filled chamber 24 can be hydraulic fluid. In the embodiment shown, however, the fluid is magnetorheological fluid and the damper assembly 10 is a magnetorheological damper. In other embodiments, the damper assembly can be an Electrorheological (ER) damper, a passive damper, or any other type of damper. The rod 34 has a passage 62 that allows a transfer conductor, such as an electrical wire 64, to extend to an electric coil 66 supported in the rod 34 or in the piston 28. The wire 64 selectively delivers current to the coil 66 from a power source (not shown) under the control of a controller (not shown) that creates magnetic flux acting on the magnetorheological fluid to vary its viscosity and resistance to flow through the passages 60 in the piston 28. Magnetorheological (MR) fluids include ferromagnetic particles that are suspended in a carrier fluid such as natural or synthetic hydrocarbon oil. The apparent viscosity of the MR fluid is rapidly modified when MR fluid is exposed to a magnetic field, with associated damping properties of the MR fluid increasing in conjunction with the increase in viscosity. This process is also readily reversible, thus allowing MR fluids to reversibly and almost instantaneously change from a free-flowing liquid to a semi-solid form.

A person skilled in the art will understand the ability to tune the viscosity of the MR fluid to actively control the level of damping of the damper assembly 10 in response to forces on the rod 34. The damper force is "tunable" between that achieved at the maximum flux density state and that achieved at the zero flux density state by varying the applied current (or voltage), with the ratio of the zero field damper force to the damper force achieved at flux saturation being referred to as the turn-up ratio, tunability or dynamic range.

Despite the additional content of the damper assembly 10 in comparison to a traditional monutube damper, the housing 16 of the damper assembly 10 enables the packaging height between the attachment ends 38, 41 of the damper assembly 10 to be relatively short, as the housing 16 is generally L-shaped in the embodiment shown, with a first leg 70 in which the piston 28 moves, a second leg 72 generally perpendicular to the first leg 70 and housing the valve assembly 12, and a third leg generally parallel with the first leg 70 and in which the gas chamber 14 and free piston 20 are housed. FIG. 6 shows the third leg 74 stacked behind the first leg 70 when viewed from behind. The damper assembly 10 with the L-shaped housing 16 provides a desired damping ability with a shortened overall length. The housing 16 can have other shapes in other embodiments.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A damper assembly comprising:
   a damper housing at least partially defining an interior chamber;
   a free piston positioned in the damper housing to separate the interior chamber into a gas-filled chamber and a fluid-filled chamber;
   a piston assembly configured to move within the fluid-filled chamber and separating the fluid-filled chamber into an extension chamber and a compression chamber;
   a valve assembly separating the compression chamber into a primary chamber adjacent the piston assembly and a secondary chamber adjacent the free piston, and configured to restrict flow from the primary chamber to the secondary chamber to cause a pressure drop during compression by the piston assembly;
   wherein the free piston is configured to slide within the damper housing in response to fluid displacement caused by movement of the piston assembly in the fluid-filled chamber; and
   wherein the valve assembly is configured to be more restrictive of flow from the primary chamber to the secondary chamber than of flow from the secondary chamber to the primary chamber.

2. The damper assembly of claim 1, wherein the valve assembly has:
   a first flow passage extending from the primary chamber to the secondary chamber;
   a second flow passage extending from the primary chamber to the secondary chamber; and
   a one-way valve configured to block flow from the primary chamber through the second flow passage and permit flow from the secondary chamber through the second flow passage.

3. The damper assembly of claim 2, wherein the first flow passage tapers from the primary chamber to the secondary chamber.

4. The damper assembly of claim 2, wherein the valve assembly includes a valve body through which the first flow passage and the second flow passage extend; and
   wherein the one-way valve includes a flapper member that is configured to be pushed against the valve body to block the second flow passage when the piston is in a compression mode and to pivot away from the valve body to unblock the second flow passage when the piston is in an expansion mode.

5. The damper assembly of claim 1, wherein the piston assembly includes a sliding piston and a rod attached to the piston and configured to move with the sliding piston; wherein the fluid is magnetorheological fluid; wherein the piston assembly includes an electrical conductor carried in a passage in the rod, and an electrical coil connected to the electrical conductor; and
   wherein the piston assembly has passages that permit fluid flow between the compression chamber and the extension chamber.

6. The damper assembly of claim 1, wherein the housing has a first leg in which the piston assembly moves, a second leg generally parallel with the first leg and in which the free piston slides, and a third leg housing the valve assembly and generally perpendicular to the first leg and the second leg.

7. A damper assembly for a vehicle suspension system comprising:
   a damper housing at least partially defining an interior chamber;
   a free piston positioned in the damper housing to separate the interior chamber into a gas-filled chamber and a fluid-filled chamber;
   a piston assembly including a sliding piston and a rod extending from the sliding piston; wherein the sliding piston is configured to translate within the damper housing to thereby separate the fluid-filled chamber into an extension chamber and a compression chamber, with the rod moving in the extension chamber and extending out of the damper housing;
   a valve assembly separating the compression chamber into a primary chamber adjacent the sliding piston and a secondary chamber adjacent the free piston, and configured to be more restrictive of flow from the primary chamber to the secondary chamber than of flow from the secondary chamber to the primary chamber, the valve assembly thus supplementing compression damping; and
   wherein the free piston is configured to move within the damper housing in response to a volume displacement of the rod translating in the fluid-filled chamber.

8. The damper assembly of claim 7, wherein the valve assembly has:

a first flow passage extending from the primary chamber to the secondary chamber;
a second flow passage extending from the primary chamber to the secondary chamber; and
a one-way valve configured to block flow from the primary chamber through the second flow passage and permit flow from the secondary chamber through the second flow passage.

9. The damper assembly of claim 8, wherein the first flow passage tapers from the primary chamber to the secondary chamber.

10. The damper assembly of claim 8, wherein the first and second flow passages are annular.

11. The damper assembly of claim 8, wherein the valve assembly includes a valve body through which the first flow passage and the second flow passage extend; and
wherein the one-way valve includes a flapper member that is configured to be pushed against the valve body to block the second flow passage when the piston is in a compression mode and to pivot away from the valve body to unblock the second flow passage when the piston is in an expansion mode.

12. The damper assembly of claim 7, wherein the housing has a first leg in which the piston slides, a second leg generally parallel with the first leg and in which the free piston slides, and a third leg housing the valve assembly and generally perpendicular to the first leg and the second leg.

13. The damper assembly of claim 7, wherein the fluid is magnetorheological fluid; wherein the piston assembly includes an electrical conductor carried in a passage in the rod, and an electrical coil connected to the electrical conductor; and
wherein the sliding piston has passages that permit fluid flow between the compression chamber and the extension chamber.

14. A vehicle comprising:
a rotatable tire and wheel assembly;
a vehicle body;
a suspension system including a damper assembly operatively connected to the tire and wheel assembly and to the body, and configured to dampen vertical movements of the wheel, the damper assembly having:
a housing defining an interior chamber;
a sliding piston within the housing;
a rod extending from the sliding piston out of the housing and having an end operatively connected to the body;
a free piston separating the interior chamber into a fluid-filled chamber and a gas-filled chamber;
a passive valve assembly in the fluid-filled chamber between the sliding piston and the free piston, and configured to create a pressure drop to reduce static pressure in the fluid-filled chamber acting on the free piston;
wherein the valve assembly separates the fluid-filled chamber into a primary chamber at the sliding piston and a secondary chamber at the free piston;
wherein the valve assembly has a first flow passage extending from the primary chamber to the secondary chamber; wherein the valve assembly has a second flow passage extending from the primary chamber to the secondary chamber, and a one-way valve configured to block flow from the primary chamber through the second flow passage and permit flow from the secondary chamber through the second flow passage so that the valve assembly is more restrictive of flow from the primary chamber to the secondary chamber than of flow from the secondary chamber to the primary chamber.

15. The vehicle of claim 14, wherein the housing has a first leg in which the sliding piston slides, a second leg generally parallel with the first leg and in which the free piston slides, and a third leg housing the valve assembly and generally perpendicular to the first leg and the second leg; and wherein the housing is connected to the tire and wheel assembly at the first leg.

16. The vehicle of claim 14, wherein the first flow passage tapers from the primary chamber to the secondary chamber.

17. The vehicle of claim 14, wherein the first and second flow passages are annular.

18. The vehicle of claim 14, wherein the fluid is magnetorheological fluid; wherein the sliding piston has passages that permit fluid flow between the compression chamber and the extension chamber; and
wherein the damper assembly has an electrical conductor carried in a passage in the rod, and an electrical coil in the sliding piston connected to the electrical coil.

19. The vehicle of claim 14, wherein the valve assembly includes a valve body through which the first flow passage and the second flow passage extend; and
wherein the one-way valve includes a flapper member that is configured to be pushed against the valve body to block the second flow passage when the piston is in a compression mode and to pivot away from the valve body to unblock the second flow passage when the piston is in an expansion mode.

* * * * *